United States Patent [19]

Arnold

[11] Patent Number: 5,021,652
[45] Date of Patent: Jun. 4, 1991

[54] DIRECTIONAL GAMMA RAY SPECTROMETER

[75] Inventor: Dan McCay Arnold, Katy, Tex.

[73] Assignee: Halliburton Logging Services, Inc., Houston, Tex.

[21] Appl. No.: 463,587

[22] Filed: Jan. 11, 1990

[51] Int. Cl.$^5$ .......................... G01V 5/06; G01T 1/20
[52] U.S. Cl. .................................. 250/267; 250/256; 250/363.1; 250/366
[58] Field of Search ..................... 250/267, 505.1, 256, 250/260, 366, 363.10, 363.01

[56] References Cited

U.S. PATENT DOCUMENTS

| | | | |
|---|---|---|---|
| 3,183,358 | 5/1965 | Cooley | 250/266 |
| 3,562,528 | 2/1971 | Joyce | 250/366 |
| 3,894,234 | 7/1975 | Mauch et al. | 378/146 |
| 4,228,350 | 10/1980 | Paap et al. | 250/267 |
| 4,618,765 | 10/1986 | Sonne | 250/269 |
| 4,638,164 | 1/1987 | Sonne et al. | 250/366 |

FOREIGN PATENT DOCUMENTS 739455 6/1980 U.S.S.R. .............................. 250/260

Primary Examiner—Constantine Hannaher
Attorney, Agent, or Firm—William J. Beard

[57] ABSTRACT

This disclosure is directed to a scintillation crystal surrounded by a sleeve and having a window formed therein. The scintillation crystal has end located first and second photomultiplier tubes which provide output signals. A scintillation event observed in the crystal is seen by both photomultiplier tubes and both form output signals. The output signals have a relationship determining the point of impingement along the length of crystal of the photon gamma radiation; in turn, that photon is located relative to a surrounding shield having a helical window formed therein so that the relative angle of impingement can be determined. The relative angle is then converted into the absolute angle relative to the well borehole by referencing a north seeking gyroscope supported by the sonde. The output signals are also used to determine the energy of the impinging gamma radiation using well known pulse height analysis spectroscopy techniques.

18 Claims, 2 Drawing Sheets

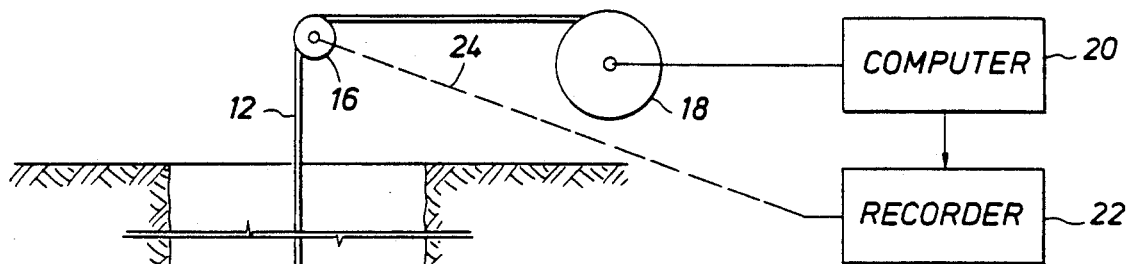
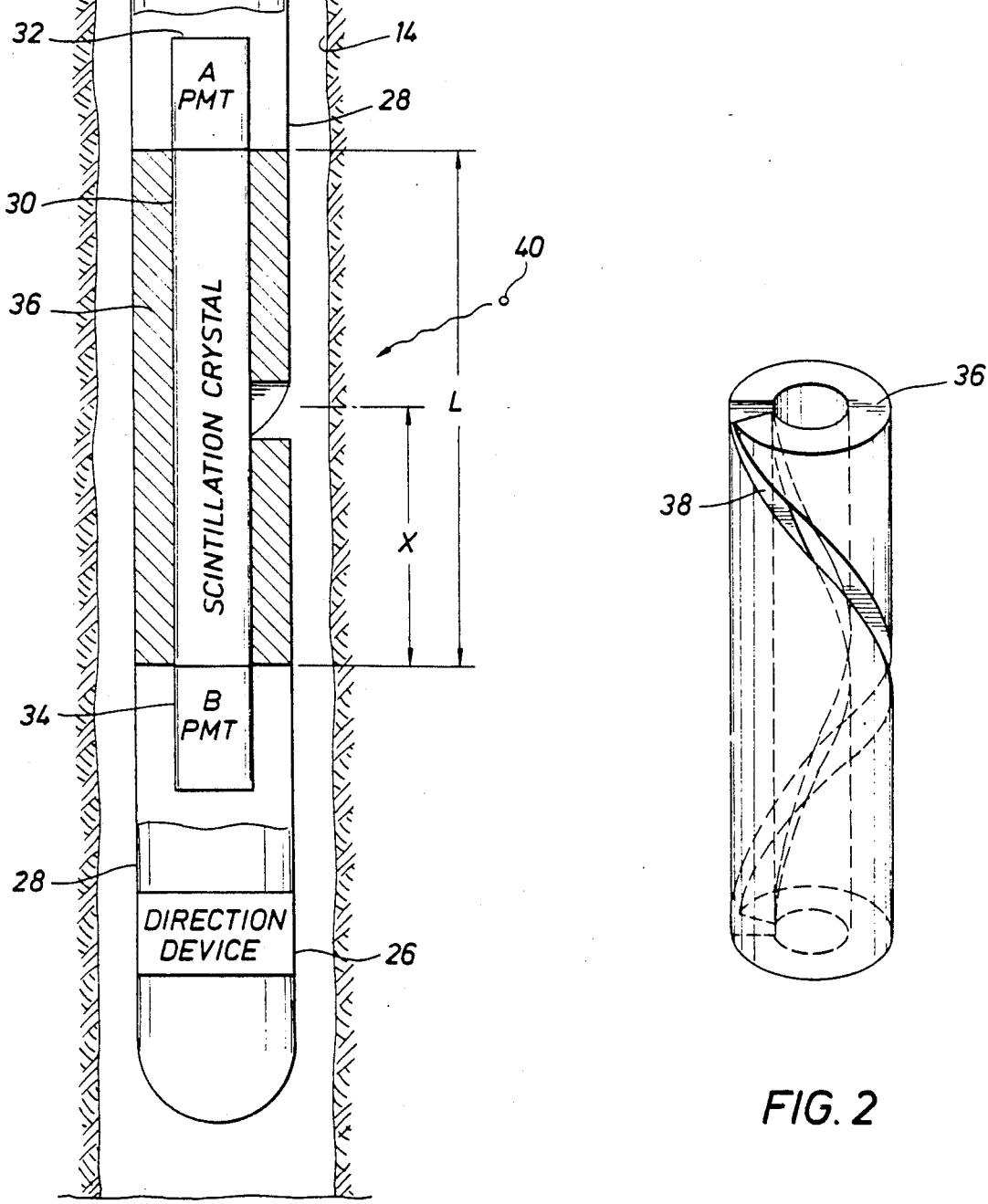
FIG. 1
FIG. 2

DIRECTIONAL GAMMA RAY SPECTROMETER

BACKGROUND OF THE DISCLOSURE

In well logging activities, a gamma ray measuring device formed of an elongate cylindrical scintillation crystal is normally used to detect gamma radiation. Ordinarily, this measurement is made in a non-directional fashion. That is, the crystal is responsive to gamma ray impingement from all directions of azimuth with respect to the well borehole. In many circumstances, it would be desirable, indeed helpful, to have a gamma ray measurement which is responsive to the direction of impingement. The present apparatus is directed to this, namely, provision of the azimuth of the gamma radiation. In the past, directionally sensitive devices have utilized a type of cylindrical shutter or collimator. Such a device typically has been made of lead or tungsten to provide suitable gamma ray attenuation. The shutter or collimator is typically rotated with an end located drive motor. Depending on the mode of operation, it can be simply rotated or it can be stopped after discrete rotation increments. In whatever fashion it is used, the window or port in the shutter is directed in a particular direction, counts are recorded for a specified interval, and the directional sensitivity is thus provided. As will be understood, this requires rotating a sleeve within a sleeve referring to the shutter which typically is a rotating sleeve mounted within the elongate tubular housing of a sonde. Other methods include clusters of detectors whose efficiencies are relatively low, and the associated electronics to maintain relative balanced sensitivity is complex.

The present apparatus sets forth a method and apparatus for detecting the direction of impingement by first determining the point along the length of the scintillation crystal as which the gamma ray impinges. The apparatus is simple electronically, and has no moving parts. For definitional purposes, assume that photomultiplier tubes are located at both ends of the scintillation crystal. Assume further that both of the PMTs provide output signals A and B indicative of a particular photon impingement. In accordance with the teachings of U.S. Pat. No. 4,618,765, the point X along the length L of the scintillation crystal is given by the relationship $X = L[1 + (A/B)^{\frac{1}{2}}]^{-1}$.

Consider the easy case where the output signals A and B from the end located, sensitivity matched, PMTs are exactly equal. In that example where A and B are equal, the denominator of the foregoing equation is 2; in that instance, the variable X is one half of the length L. The referenced patent also provides information regarding the energy of the impinging gamma ray which is a function of the output signals A and B and the physical dimensions of the scintillation crystal.

The present disclosure takes advantage of the foregoing in conjunction with a direction measuring device in the sonde such as a reference gyroscope. A reference gyroscope is preferable because it can be used in uncased and cased wells. Alternately, magnetic measuring devices can also be used so long as there is no casing and the sonde is substantially free of ferrous metal influence. In any event, that provides a reference direction so that the particular azimuthal position of the sonde at the instance that data is obtained can be measured. The present disclosure describes a collimator structure arranged around the scintillation crystal. The collimator is a sleeve of material such as lead or tungsten which readily absorbs gamma radiation. Further, the sleeve is fixed in position with respect to the scintillation crystal. Further, the sleeve has a window cut in it which interrupts the sleeve. The window is a helix of one full revolution from top to bottom matching the length L of the scintillation crystal. As an easy example, if the scintillation crystal is precisely one foot in length, then the helix provides one full turn per foot, so that 360° of azimuthal perspective is obtained.

The present apparatus further includes a fixed reference for some direction and the preferred form is a gyroscope which provides an indication of north. Thus, in the method disclosed hereinbelow, a north reference is established, and at any given instant, when a gamma ray impinges in the scintillation crystal, direction can be determined in a relative fashion, and also in an absolute fashion with respect to the reference. The scintillation event caused by the gamma ray is detected at the two respective end located PMTs, and the position of the event along the length of the scintillation crystal is first determined as taught in U.S. Pat. No. 4,618,765. Once that lengthwise location is known, the azimuthal direction relative to the scintillation crystal is known without ambiguity, and the absolute azimuth of the direction can then be determined.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 1 shows a sonde suspended in a well borehole and incorporating a scintillation crystal with end located photomultiplier tubes wherein the crystal is surrounded by a sleeve of gamma ray attenuating material having a window formed therein;

FIG. 2 is a detailed view of the helical window formed in the gamma radiation attenuating sleeve.

DETAILED DESCRIPTION OF THE PREFERRED EMBODIMENT

Figure 3:
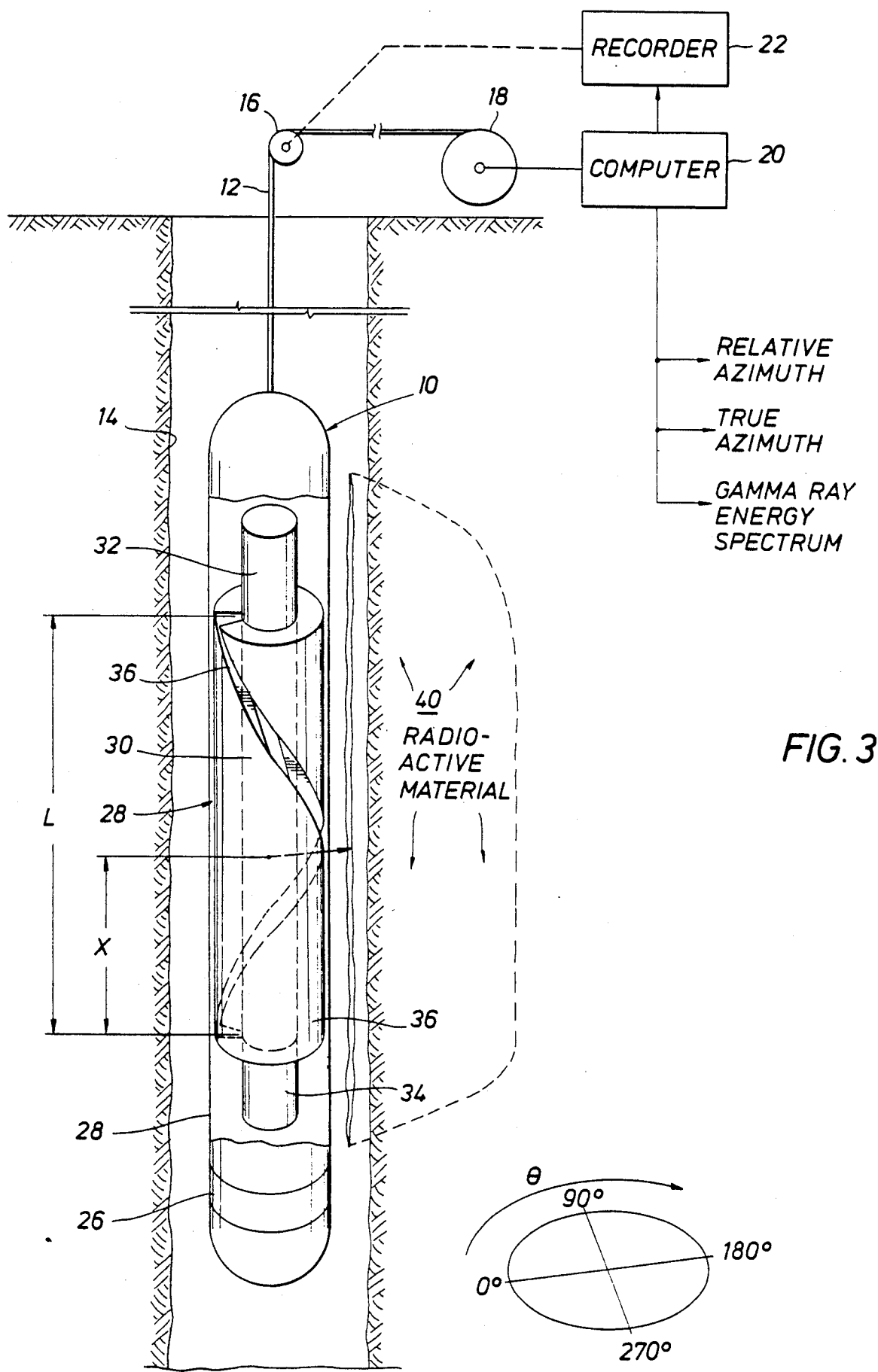
FIG. 3 shows an example of the sonde being used to determine the azimuthal position of a radioactive source within an earth formation in the vicinity of the borehole.

Attention is now directed to FIG. 1 of the drawings in which a sonde 10 is shown suspended in a well borehole. The sonde 10 is supported on a logging cable 12 which enables it to be lowered to the bottom of a well 14. The well can be open hole or cased. The present apparatus operates in both instances. The sonde is lowered to the bottom of the well and retrieved on the logging cable 12 which encloses one or more electrical signal conductors extending to the surface. The logging cable 12 passes over a sheave 16 which is located above the well head, and the logging cable is spooled on a reel or drum 18. The electrical conductors in the cable 12 connect with data processing equipment including a CPU 20. The signals are placed in suitable format, and are then provided to a recorder 22. This records the data as a function of depth. The depth is indicated for the recorder 22 by means of an electronic or mechanical depth measuring apparatus 24 which is connected to the sheave 16. The sonde 10 is normally retrieved from the well 14 by spooling the cable 12 onto the drum 18 where the cable is stored. As the sonde 10 is raised, readings are taken along the length of the borehole and data is provided for recordation as a function of depth.

The sonde may or may not contain a neutron source or a gamma ray source. The sonde may or may not have duplicate sets of equipment such as that shown in the present disclosure. For instance, many tools operate with separate gamma responsive devices. In some tools, two are included along with a neutron source or a gamma ray source which irradiates the formation. The present invention is particularly adapted for use in measurement of the direction of gamma radiation. This refers to gamma radiation that is either naturally occurring within the formation or the borehole, or is in response to neutron flux irradiation of the formation and borehole, or is in response to gamma radiation emitted from the sonde and scattered by the formation and borehole. The present apparatus is especially successful without regard to the cause of the gamma radiation. That is, it responds both to the naturally occurring gamma radiation and that which is responsive to the irradiation occasioned by an integrated neutron and/or gamma ray flux source in the sonde.

The sonde 10 encloses a direction determining device 26. This is preferably a gyroscope having a north seeking capability which provides a continual output referenced to the structure of the sonde. In other words, it determines a particular direction which is usually north, and that vector is determined with respect to the sonde itself. Accordingly, measurements made as described hereinafter by the scintillation crystal are relative azimuthal measurements, but equipped with the reference north vector just defined, the absolute direction of radiation impingement can be determined. The direction determining device provides an output which is supplied over the logging cable 16 for the surface equipment. The sonde also includes an elongate shell or housing 28 which is a surrounding structure relatively transparent to gamma radiation of interest. That is, it is a shell which provides fluid isolation for the components on the interior of the sonde, and it is generally transparent to impinging gamma radiation. On the inside, the shell encloses and supports a scintillation crystal 30. The crystal 30 is an elongate cylindrical structure and is, as an example, the well known sodium iodide (NaI) crystal with appropriate doping. This responds to impinging gamma rays by forming light photons in the crystal. The light photons resultant from gamma ray impingement are observed by duplicate end locate photomultiplier tubes. They provide the output signals which are hereinafter called A and B, the upper PMT being identified at 32 and the lower PMT being identified at 34. Other than location or position, they are identical, and they cooperate with identical amplifier circuits. Consider the response of the system to a single gamma ray of energy E impinging upon the crystal 30 at position X. The amplitudes of the two output signals A and B from the two PMTs 32 and 34 will be a function of (1) the energy E of the gamma ray and (2) the impinging position X. The energy E of the gamma ray can be closely approximated by averaging the amplitude signals A and B in the computer 20 and using well known techniques of multichannel pulse height analysis spectroscopy. The impingement position X of the gamma ray can be determined by computing in the computer 20 the ratio of output amplitudes of signals A and B using the relationship $X = L[1 + (A/B)^{\frac{1}{2}}]^{-1}$ from the referenced patent. The amplification and computing circuits are sufficiently fast to process independently each impinging gamma ray.

The numeral 36 identifies a sleeve surrounding the scintillation crystal 30. The sleeve 36 is preferably formed of a material which provides substantial attenuation and absorption to the impinging gamma radiation. Preferred materials are lead or tungsten. The attenuation obtained thereby is in part determined by the nature of the material and in part by the thickness required; the sleeve 36 is made sufficiently thick that substantial discrimination is obtained so that gamma rays passing through the window 38 are easily discerned and in contrast gamma rays are substantially attenuated and essentially absorbed by the sleeve. The sleeve 36 has a window 38 formed in its length. The window is in the form of a helix. The window is defined by radial lines through the sleeve so that it is wider at the outer surface in comparison with the inner surface of the sleeve. The window 38 is a helix which encompasses one full turn or 360°. This window extends the length of the scintillation crystal 30. Defining the upper end of the window as 0° in azimuth, the precise midpoint of the sleeve positions the window at 180°. The window 38 thus correlates a particular azimuth relative to the crystal to a particular length along the crystal. Recalling the definitions of X and L, and further recalling the equation given above, the distance X specifies the point of impingement of a particular gamma ray. Using the equation, that distance can be determined for the particular gamma ray. Once the distance is known, the relative azimuth of the gamma ray can then be determined. Once the azimuth is determined relative to the crystal, this enables subsequent determination of the direction with respect to an absolute reference such as that measured by the direction measuring device 26. Consider the following example. Assume that a gamma ray impinges on the crystal and creates output signals of amplitudes A and B from PMTs 32 and 34. Assume further that the distance X is determined using the foregoing relationship and the distance X is one fourth the length of the crystal 30, or one fourth of the length L. This correlates to a relative angle of 90° with respect to the scintillation crystal 30. However, at that instant, the azimuthal position of the sonde in the borehole 14 is unknown. That is solved by provision of the output signal from the direction measuring device 26 which is a reference relative to north or some other arbitrary direction. Since that is known for the sonde, the relative measurement obtained from the scintillation crystal 30 can then be made specific thus determining the absolute direction of impingement.

To illustrate the technique, assume that there is adjacent to the borehole 14 a radiation source 40. This source is, for the purposes of discussion, a concentration of radioactive material on one side of the borehole as shown in FIG. 3. Assume further that the source 40 provides gamma radiation which impinges on the borehole 14. This could be a radioactive propant injected under pressure in the well borehole 14 to induce a vertical fracture 41 within the formation rock. It is of great interest to determine the azimuth of the fracture in order to maximize production.

When the sonde is brought in near proximity to the radiation source 40, gamma rays 42 will reach the scintillation crystal 30 only through the portion of the helix collimator window 38 in the shield 36 which directly faces the radiation source 40. Other gamma radiation 43 will either be scattered or absorbed by the sleeve 30. The signals A and B generated by PMTs 32 and 34 are (1) processed in the computer 20 to determine the energy E of the gamma radiation as previously described, and (2) the impingement position X is computed in CPU 20 from the ratio A/B and the previously defined relationship. As will be understood, this ratio is used in the relationship given so that the variable X can be determined. Once X is known, then the relative angle with respect to the direction of impingement on the scintillation crystal can be determined. In the example shown in FIG. 3, the relative impingement angle $\theta$ is approximately 180°. Once that has been determined, the absolute angle of the azimuth to the radiation source 40 can then be determined using the absolute direction device 26.

It will be observed that the foregoing equipment operates without rotation of the sleeve 36. The sleeve is thus fixed within the surrounding sonde. The scintillation crystal 30 is likewise fixed relative to the sleeve so that rotating parts are not required. This enables the sleeve 36 to be anchored snugly and firmly within the surrounding sonde for structural integrity.

While the foregoing is directed to the preferred embodiment, the scope thereof is determined by the claims.

What is claimed is:

1. A directional gamma ray spectrometer comprising:
    (a) an elongate scintillation device responsive to impinging gamma rays, said device having spaced ends and having an elongate outer surface shaped as a cylinder;
    (b) end located scintillation responsive means for forming output indicative of scintillation events of said device;
    (c) a surrounding sleeve about said device
        (i) along the length thereof in the form of a single turn helix;
        (ii) formed of a material attenuating gamma rays to a specified degree; and
        (iii) having a window formed therein wherein the window encircles to defined a directional radiation bias and wherein the directional bias is a specified range of azimuth.

2. The apparatus of claim 1 wherein said end located scintillation responsive means comprise separate photomultiplier tubes providing separate outputs.

3. The apparatus of claim 2 wherein said scintillation device comprises an elongate scintillation crystal having a specified length and circular cross section.

4. The apparatus of claim 3 wherein said scintillation crystal is NaI.

5. The apparatus of claim 1 wherein said sleeve comprises lead, tungsten or other material highly attenuating to gamma radiation.

6. The apparatus of claim 1 wherein said surrounding sleeve has a length equal to the length of said scintillation device, has the form of a wall of material attenuating gamma rays of specified thickness along the length and circumference there, and wherein said window is defined by radial lines relative to said crystal centerline axis.

7. The apparatus of claim 1 further including direction measuring means for providing direction orientation in azimuth of a sonde enclosing said directional gamma ray spectrometer.

8. The apparatus of claim 7 wherein said direction measuring means is a gyroscope.

9. A method of determining azimuthal direction of a gamma ray source relative to a well borehole comprising the steps of:
    (a) positioning an elongate scintillation means in a well borehole for exposure to gamma radiation;
    (b) positioning a gamma radiation attenuation shield around the scintillation responsive means having a lengthwise window formed therein wherein the window is uniquely exposed in specific azimuthal directions along the length of the scintillation responsive means;
    (c) observing scintillation events in the scintillation responsive means from spaced ends thereof so that two outputs of an event are observed and are represented by two output signals; and
    (d) as a function of the two output signals, determining the direction of gamma radiation impingement relative to said scintillation responsive means.

10. The method of claim 9 wherein the elongate scintillation means is supported in a sonde and is lowered on a logging cable in a well borehole.

11. The method of claim 10 wherein said shield is fixedly positioned around said elongate scintillation means within said sonde.

12. The method of claim 9 wherein first and second end located photomultiplier tubes are positioned at the ends of an elongate cylindrical scintillation crystal to observe scintillation events occurring within the crystal.

13. The method of claim 9 further including the step of determining gamma ray energy from the two outputs.

14. The method of claim 9 further including the step of measuring the direction of gamma radiation impingement relative to a standard direction.

15. The method of claim 14 wherein the standard direction is north.

16. The method of claim 14 including the step of positioning a north seeking gyroscope means within a sonde for forming a specified directional reference output signal relative to north to provide an azimuthal reference for the window in the shield.

17. The method of claim 9 including the step of causing radiation from a location beyond the well borehole, and determining the azimuth thereof.

18. The method of claim 17 including the step of injecting a radioactive proppant into a formation adjacent to the well borehole.

* * * * *